E. P. BECKWITH.
SPRING BALANCE.
No. 12,249. Patented Jan. 16, 1855.
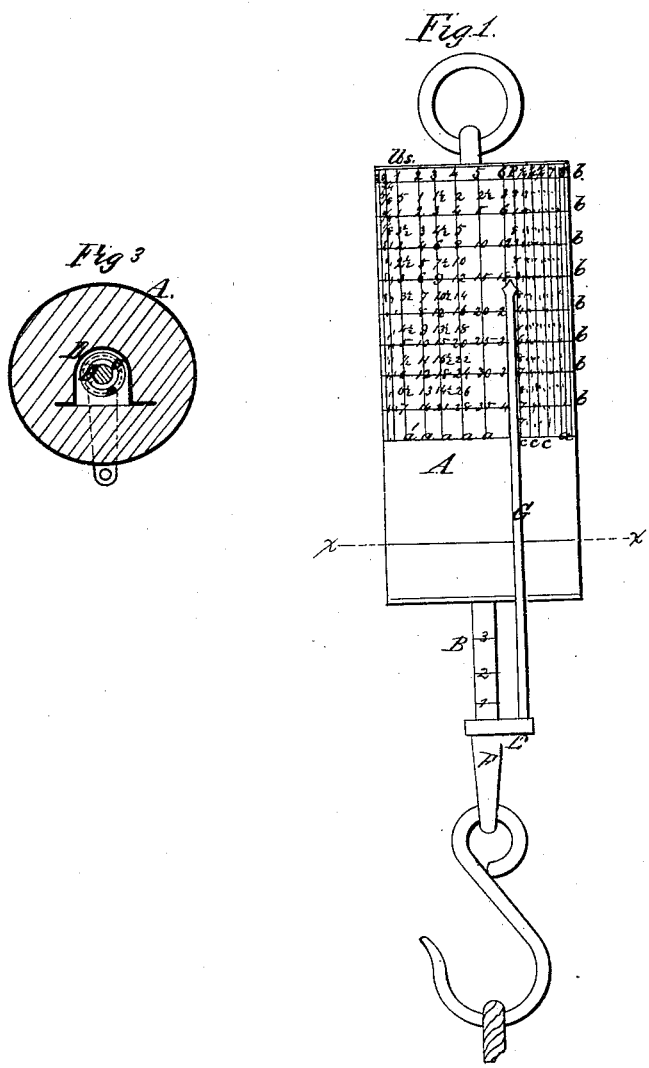

UNITED STATES PATENT OFFICE.

ELISHA P. BECKWITH, OF NEW LONDON, CONNECTICUT.

SPRING-BALANCE.

Specification of Letters Patent No. 12,249, dated January 16, 1855.

*To all whom it may concern:*

Be it known that I, ELISHA P. BECKWITH, of New London, in the county of New London and State of Connecticut, have invented a new and useful Improvement in Spring-Balances; and I do hereby declare that the following is a full, clear, and exact description of the same, reference being had to the annexed drawings, making a part of this specification, in which—

Figure 1, is an external view of my improved spring balance. Fig. 2, is a view of the sheet metal plate of which the cylinder is formed. Fig. 3, is a horizontal section of the balance taken at the line $(x)$ $(x)$ Fig. 1.

Similar letters of reference indicate corresponding parts in the several figures.

The nature of my invention consists in surrounding the spring balance with a cylinder formed of sheet metal or other proper material and having its periphery graduated as will be hereafter shown, so that, not only the weight of the article is determined but also its cost at a given price per pound.

To enable others skilled in the art to fully understand and construct my invention I will proceed to describe it.

A represents a cylinder, constructed of sheet metal or other proper material. This cylinder encompasses a spring balance which may be of the ordinary construction except that the usual index is not required, the rod B around which the spiral spring is placed being graduated as shown in Fig. 1, whereby the weight of the article to be weighed may be determined.

The spiral spring around the rod B, is shown in Fig. 3 and is designated by C and the usual casing D around the spring and rod, is also shown.

The cylinder A is attached to the casing D in any proper manner and its periphery is divided into a number of equal parts by vertical lines $(a)$ and also has a series of lines $(b)$ made around its periphery concentric with its upper and lower ends the latter lines being on a level with the division of pounds (lbs) which are on the vertical line $(a')$, see Figs. 1 and 2, the line $(a')$ being graduated to coincide with the rod B.

If the cylinder is constructed of sheet metal, the divisions or lines may be made before the cylinder is formed as shown in Fig. 2.

The lower end of the rod B is provided with the usual hook or basin, and has also an arm E upon it, said arm being loose on the rod and directly above a shoulder F at the lower end of the rod, see Fig. 1. The arm E projects horizontally from the rod B, a short distance beyond the lower edge of the cylinder and has a vertical index rod G secured to it, which is about as long as the cylinder. All the vertical lines $(a)$, are numbered from 1 upwards, the figures denoting the rate or price per pound of articles weighed and the lines $(b)$ at their points of intersection with the lines $(a)$ are numbered denoting the aggregate cost of the number of pounds, for instance suppose an article weighs 3 lbs the Fig. 3 or its division on the rod B will be even with the lower edge of the cylinder A, and the top of the index G will be on a line with the 3rd line $(b)$ from the top of the cylinder, and if the price of this article be 6 cts per pound the index is turned to coincide with the vertical line $(a)$ numbered 6, and the top of the index will cover the point of intersection of the lines $(a)$ $(b)$ numbered 18, which is the whole or aggregate cost of the article. The cylinder has also several vertical lines $(c)$ upon it for fractions, see red lines Figs. 1 and 2, so that if the price per pound is composed of a whole number and a fraction, the sum of the fractions may be added without difficulty, the sum of the whole numbers and fractions being determined separately and then added.

Having thus described my invention, what I claim as new and desire to secure by Letters Patent, is—

The employment or use of the cylinder A surrounding the spring balance and divided into parts or graduated substantially as herein shown, so that by the aid of the index rod G or its equivalent not only the weight but also the whole or aggregate cost of any article may be determined at a given price per pound.

ELISHA P. BECKWITH.

Witnesses:
JOHN P. SPICER,
BUTLER I. STAYNER.